April 7, 1959          F. C. MOCK          2,880,790

STARTING FUEL CONTROL FOR GAS TURBINE ENGINES

Filed Aug. 10, 1951          2 Sheets-Sheet 1

INVENTOR.
FRANK C. MOCK
BY
ATTORNEY

United States Patent Office 2,880,790
Patented Apr. 7, 1959

2,880,790

STARTING FUEL CONTROL FOR GAS TURBINE ENGINES

Frank C. Mock, South Bend, Ind., assignor to Bendix Aviation Corporation, South Bend, Ind., a corporation of Delaware Application August 10, 1951, Serial No. 241,255

4 Claims. (Cl. 158—36.4)

When starting a gas turbine engine, it is desirable to supply fuel to the spray nozzles and combustion chambers at some predetermined pressure build-up as ignition takes place and the engine accelerates to a self-sustaining or idling speed. This results in a smooth, yet rapid start without overheating the engine; and the primary object of the present invention is to provide a fuel control device capable of accomplishing such result.

Certain fuel supply systems utilize a so-called main fuel control which may not give the desired regulation at starting speeds; and another object is to provide an auxiliary control which may be readily adjusted to give the required starting flows and coordinated with the main control as the engine attains some predetermined self-sustaining speed.

Other and more specific objects are:

To provide a fuel control device in a starting system which will enable the degree of pressure at which the starting fuel is supplied to the nozzles to be conveniently adjusted;

To provide a simplified starting fuel regulator for fuel systems operating on the by-pass principle to control fuel pressure to the nozzles;

To provide a regulator for starting fuel having a control valve which will open at some predetermined pressure and close gradually as the main fuel control takes over at some self-sustaining engine speed;

And to simplify and at the same time render more reliable starting fuel control systems of the type specified.

The foregoing and other objects and advantages will become apparent in view of the following description taken in conjunction with the drawings, wherein.

Figure 1:
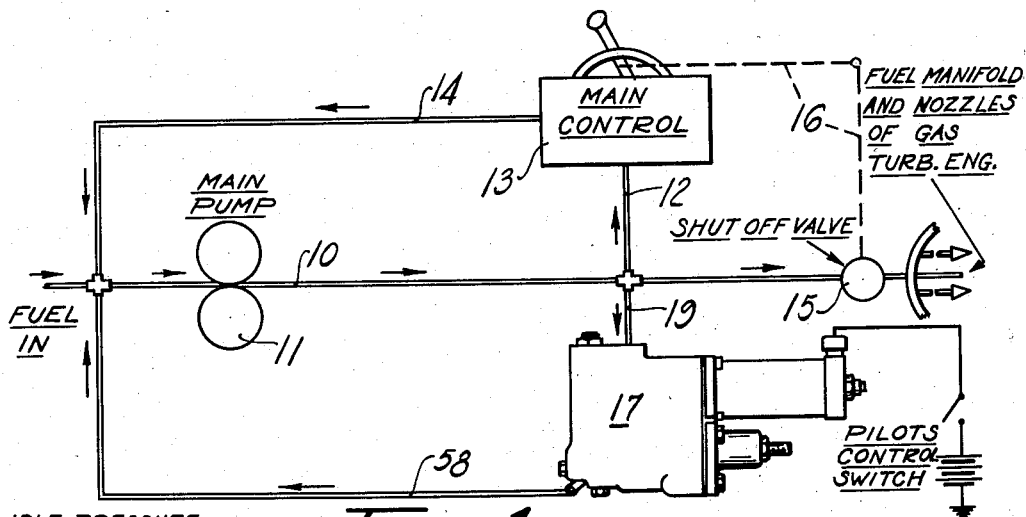
Figure 1 is a schematic view of a fuel supply system of the by-pass type for gas turbine engines incorporating a starting control regulator in accordance with the invention.

Referring to Figure 1, fuel is supplied under pressure from a suitable source, not shown, to the fuel manifold of a gas turbine engine by way of conduit 10 having a pressuring pump 11 therein, which is driven from the engine and supplies fuel in relation to engine speed. A branch conduit 12 communicates the conduit 10 with the input side of a main fuel control 13, which may be of any suitable type capable of regulating the supply pressure by varying the quantity of fuel by-passed to the low pressure side of the pump 11 by way of conduit 14. Such main control is usually provided with a pilot's lever for selecting engine operational speeds, and may regulate the rate of fuel feed automatically as a function of certain parameters, such as speed and mass air flow. A fuel shut-off valve 15 enables the supply of fuel to be completely shut off from the engine when the latter is to be closed down, said valve being operatively connected to the main control by suitable linkage 16.

Figure 2:
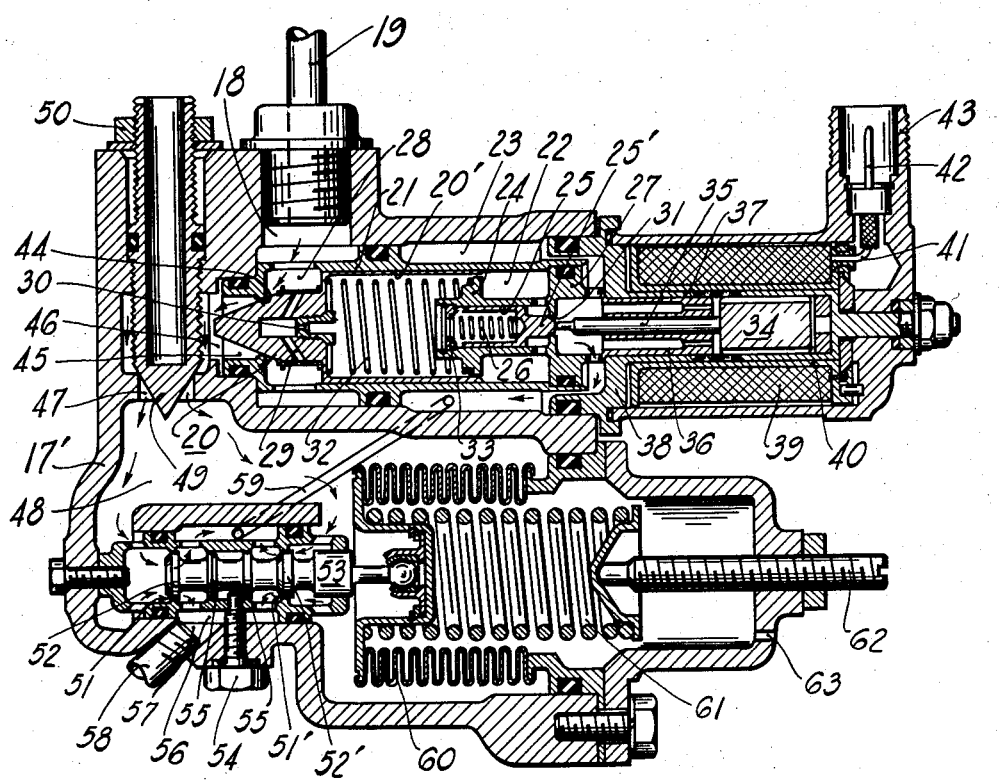
Figure 2 is a substantially central sectional view of the starting fuel regulator.

The starting fuel regulator of the instant invention is generally indicated at 17 in Figure 1 and is shown in section in Figure 2. It comprises a suitably shaped body casting 17' provided with an inlet 18 which receives by-pass fuel at pump supply or P-1 pressure from the main conduit 10 by way of conduit 19. A control valve is indicated at 20; it is formed on the one end of a hollow piston 20', slidably mounted in a cylinder 21, defining an inner chamber 22 and an outer surrounding chamber 23. The rear or right-hand end of the piston 20' is telescoped over a valve body or cage 24, which slidingly mounts a hollow piston 25, formed at one end with a valve closure member 25', normally urged to closed position by a spring 26. At its right-hand end, the body or cage 24 is formed with an annular enlargement 27, which in part telescopes in and is fixed to the rear end of the cylinder 21.

Fuel entering at 18 passes into a chamber 28, and the valve 20 is provided with passages 29 and a calibrated restriction 30, which vent fuel from chamber 28 to the interior of the piston 20', from which it may flow across the valve body or cage 24 to chamber 22. The clearance between member 24 and piston 20' is such that no substantial restriction exists between the interior of piston 20' and the chamber 22. The center of the annulus 27 is formed with a valve orifice 31, which is controlled by the valve 25'. A spring 32 normally urges the valve 20 to seated position.

A solenoid valve assembly is provided and consists of a central armature 34 and an abutting pin 35, the latter being adapted to engage the valve 25' and open same against the resistance of the spring 26. The armature 34 is limited in a valve opening direction by a stop 33, adapted to engage the adjacent end of the piston 25. A bushing 36 carries a central guide sleeve for the pin 35, said bushing being fixed in a hollow cylindrical part 37, which receives the armature 34 and at its left-hand end terminates in a cap 38, part of which telescopes into the surrounding wall of the main housing or casting 17'. A solenoid coil or winding 39 is mounted on a core member 40 and is provided with a lead 41, which connects with a terminal 42, located in a socket 43.

When the coil 39 is energized, it causes the armature 34 to move inwardly or toward the left as viewed in Figure 2 and open the valve 25'. Upon de-energization of the coil 39, the spring 26 closes said valve and moves the armature back to the position shown in the drawing.

From inlet chamber 28 fuel flows across orifice 44, controlled by valve 20, and thence by way of passage 45, valve chamber 46, and orifice 47 to chamber 48. The orifice 47 is controlled by a contoured needle valve 49, which is conveniently adjustable exteriorly of the regulator upon loosening lock nut 50. This valve determines the P-1 pressure build-up of the starting fuel during the starting period, as will be more fully hereinafter explained.

The chamber 48 is provided with outlet ports 51, 51', controlled by valve closure members 52, 52', carried by a valve body 53. These members 52, 52' are of equal effective area to effect balancing. The range of valve movement is limited by means of a screw 54, having its inner end adapted to engage annular stops 55 formed on said body. Fuel flowing across ports 51, 51' passes into a chamber 56 and thence through outlet 57 and conduit 58 back to the low pressure side of the pump 11, compare Figure 2 with Figure 1.

At this point it should be noted that the annular chamber 23, which receives inlet fuel when the vent valve 25' is opened, is vented to the outlet chamber 56 by way of passage 59.

A bellows 60 is mounted in the chamber 48 and has its movable end connected to the valve body 53; it is loaded by a spring 61, adjustable externally of the regulator by means of screw 62. This adjustment determines the initial pressure at which the valves 51, 51' open and begin to by-pass fuel through the regulator. Bellows 60 is vented to the atmosphere at 63.

Operation

Figure 3:
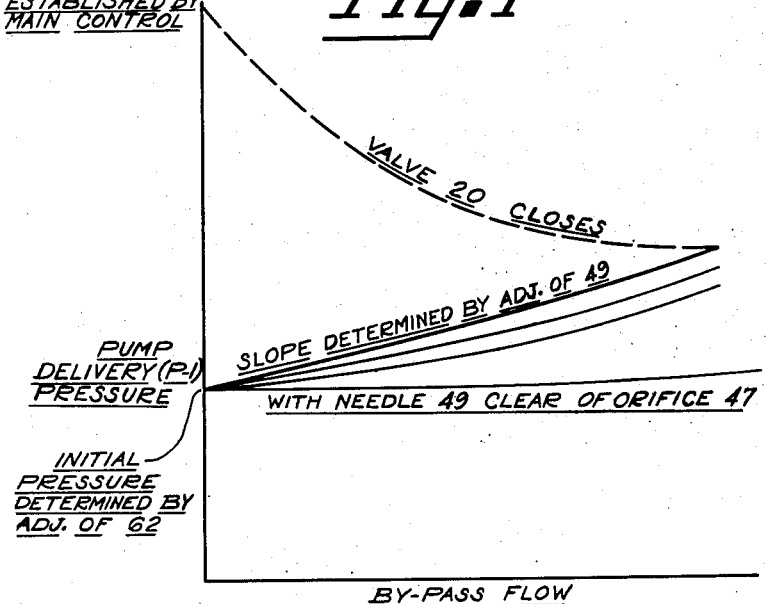
Figure 3 is a curve chart, illustrating the operation of the regulator.

In the following description of operation, it will be assumed that the improved starting control is to be used as shown in Figure 1 of the drawings, viz. with a main fuel control operable to by-pass excess fuel not required by the engine. At the beginning of the starting regime, the main control may be set to require higher pressures than those experienced during this period, for example, an idle setting so that there will be no flow through line 12, all regulation being had by the starting control. The pump 11, being driven in relation to engine speed, will supply fuel at a rate which varies with variations in engine speed. Assuming the main fuel control has been set at idle, and that the needle 49, Figure 2, has been adjusted in the orifice 47 to obtain a gradual increase in pressure of the starting fuel as the engine speed increases; when the pilot engages his starting motor, not shown, he may at the same time close a switch and energize the solenoid 39, whereupon the pin 35 moves inwardly and opens the valve 25'. Fuel now flows by way of conduit 19 and inlet 18 to the entrance chamber 28 and by way of vent passage 29 and restriction 30 to the interior of piston 20' and thence through orifice 31 to the chamber 23 and by way of vent passage 59 to the outlet chamber 56. This results in a sharp increase in the differential across the valve 20 and the latter opens, permitting fuel to flow to the chamber 48 by way of orifice 44, chamber 46, and orifice 47. When the pressure in chamber 48 attains a predetermined value sufficient to overcome the resistance of the spring 61 and bellows 60, the valves 52, 52' open and fuel flows to the low pressure side of the pump by way of outlet 57 and conduit 58. The horizontal line in Figure 3 illustrates the point or value of P–1 pressure at which the valves 52, 52' open. It will be understood that the opening pressure is correlated with the nozzle pressure by adjustment of the screw 62. This is because the pressure drop across the nozzles, which is substantial, is essentially the same for low engine speeds, as if the nozzles were discharging into atmospheric pressure. The fluid pressure in chamber 48 is essentially the same as that immediately upstream of the nozzles. This pressure is such as will give the required nozzle delivery for ignition at low engine speeds. As the engine speed increases, fuel flow will increase and hence the differential across the orifice 47 will increase. This drop will vary with variations in area of said orifice, so that the slope of the line shown in Figure 3 may be determined by adjusting the needle 49. When the engine attains a speed approximating the idle setting of the main fuel control, the main control takes over. The pilot then opens the switch which controls the solenoid valve, and the spring 26 closes the valve 25'. The pressure differential across the control valve 20 now commences to equalize, but this takes place more or less gradually due to the restriction 30. Hence the control valve closes more or less gradually, as indicated by the dotted slope line in Figure 3. This gradual closing off of the by-pass flow through the starting control causes the starting fuel flow to merge gradually with the idle fuel flow of the main control.

Another advantage which should be noted is that back pressure variations or pulsations in the return or by-pass line 58 from the starting control, which may result from the action of a boost pump or other causes, do not affect the starting fuel flows, since the regulator valve 53 maintains the pressure downstream of the orifice 47 at a value determined by spring 61 and bellows 60, which latter is vented to the atmosphere at 63.

It will thus be seen that the improved starting fuel control as disclosed herein gives an adjustable opening point as well as a readily adjustable pressure build-up of the starting fuel during the starting regime. Furthermore, the unit is simple in construction and reliable in operation, and may be relatively light in weight.

I claim:

1. In a fuel control system for a gas turbine engine having one or more fuel discharge nozzles, a conduit for conducting fuel to said nozzles, a pump for pressurizing the fuel in said conduit in relation to engine speed, a first valve operatively responsive to said pressurized fuel and arranged to open and by-pass fuel to the inlet of said pump subjected to a predetermined pressure thereby determining the initial value of the pressure of said fuel being delivered to said nozzle, a second valve in series with said first valve adjustable to determine the rate of increase of supply pressure with an increase in speed, a third valve in series with said second valve for controlling the admission of fuel to said first and second valves, and means for controlling actuation of said third valve including an additional flow passage in parallel with said first and second valves, a fourth valve in said passage movable in an opening direction to cause said third valve to admit flow to said first and second valves and movable in a closing direction to cause said third valve to block flow to said first and second valves.

2. A fuel control system as claimed in claim 1 wherein said third valve includes dashpot means for effecting a gradual closing thereof.

3. A fuel control system as claimed in claim 1 wherein said first valve is connected to a pressure device responsive to changes in atmospheric pressure to vary the amount of by-pass flow and, hence, the starting fuel pressure drop across the nozzles with changes in atmospheric pressure.

4. In a fuel control system for a gas turbine engine having one or more fuel discharge nozzles, a fuel conduit for supplying fuel to said nozzle, a pump for pressurizing the fuel in said conduit, and a main fuel control operably connected to said conduit and adapted to by-pass fuel in excess of existing engine requirements: a starting fuel control operably connected to said conduit in parallel with said main control also arranged to by-pass fuel in excess of existing engine requirements, said starting fuel control including a valve arranged to open when subjected to a predetermined fuel supply pressure and determine the initial value of the supply pressure, a second valve in series with said first named valve adjustable to predetermine the rate of increase of the supply pressure, a third valve in series with said second named valve for admitting fuel to the starting control, means for controlling actuation of said third valve including an additional flow-passage in parallel with said first and second valves, a fourth valve in said passage movable in an opening direction to cause said third valve to admit flow to said first and second valves and movable in a closing direction to cause said third valve to block flow to said first and second valves, and dashpot means associated with said third valve such that closing of said fourth valve will provide a gradual closing of said third valve whereby the starting fuel flow is caused to merge gradually with the flow scheduled by said main fuel control.

(References on following page)

References Cited in the file of this patent

UNITED STATES PATENTS

| | | | |
|---|---|---|---|
| 322,002 | Phillips | July 14, | 1885 |
| 487,342 | Wittemann | Dec. 6, | 1892 |
| 700,485 | Finney | May 20, | 1902 |
| 1,722,985 | Kling | July 30, | 1929 |
| 2,067,229 | Birch | Jan. 12, | 1937 |
| 2,305,151 | Fields | Dec. 15, | 1942 |
| 2,500,750 | Halenza | Mar. 14, | 1950 |
| 2,508,260 | Holley | May 16, | 1950 |
| 2,538,582 | Mordell et al. | Jan. 16, | 1951 |
| 2,543,366 | Haworth et al. | Feb. 27, | 1951 |
| 2,552,231 | Streid et al. | May 8, | 1951 |
| 2,564,127 | Orr | Aug. 14, | 1951 |
| 2,582,259 | Koplin et al. | Jan. 15, | 1952 |
| 2,621,599 | Harding | Dec. 16, | 1952 |
| 2,637,374 | Campbell | May 5, | 1953 |
| 2,686,561 | Isreeli et al. | Aug. 17, | 1954 |
| 2,695,498 | Szydlowski | Nov. 30, | 1954 |

FOREIGN PATENTS

| | | | |
|---|---|---|---|
| 38,207 | Austria | Aug. 10, | 1909 |